(12) United States Patent
Roy et al.

(10) Patent No.: US 12,015,642 B2
(45) Date of Patent: Jun. 18, 2024

(54) METHODS, SYSTEMS, AND COMPUTER READABLE MEDIA FOR TESTING A NETWORK SYSTEM UNDER TEST COMMUNICATING OVER A SECURE CHANNEL

(71) Applicant: Keysight Technologies, Inc., Santa Rosa, CA (US)

(72) Inventors: Debojyoti Roy, Kolkata (IN); Pradosh Tapan Datta, Kolkata (IN); Robert Brian Luking, Ellicott City, MD (US); Aymen Chebab, Surrey (CA)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 227 days.

(21) Appl. No.: 17/175,329

(22) Filed: Feb. 12, 2021

(65) Prior Publication Data
US 2022/0263866 A1 Aug. 18, 2022

(51) Int. Cl.
*H04L 9/40* (2022.01)
*H04L 9/08* (2006.01)
*H04L 43/50* (2022.01)

(52) U.S. Cl.
CPC ............ *H04L 63/162* (2013.01); *H04L 9/083* (2013.01); *H04L 43/50* (2013.01)

(58) Field of Classification Search
CPC ........ H04L 63/162; H04L 9/083; H04L 43/50
See application file for complete search history.

(56) References Cited

U.S. PATENT DOCUMENTS

| | | | |
|---|---|---|---|
| 7,853,691 B2 | 12/2010 | Elzur et al. | |
| 8,340,299 B2 * | 12/2012 | Buer | H04L 9/0822 380/278 |
| 9,397,828 B1 * | 7/2016 | Lieber | G09C 1/00 |
| 10,326,540 B2 * | 6/2019 | Olgaard | G01R 31/318371 |
| 10,708,245 B2 | 7/2020 | Sankaran et al. | |
| 11,283,835 B1 * | 3/2022 | Gordon | H04L 9/0819 |
| 2004/0208129 A1 * | 10/2004 | Old | H04J 3/1617 370/241 |

(Continued)

OTHER PUBLICATIONS

Naina Mittal and Ira Acharya "Open Framework for Managed Regression Testing", D. Hogrefe and A. Wiles (Eds.): TestCom 2003, LNCS 2644, pp. 265-278, 2003. (Year: 2003).*

(Continued)

*Primary Examiner* — Catherine Thiaw (57) ABSTRACT

Methods, systems, and computer readable media for testing a system under test (SUT). A method includes sending a first test packet to the SUT over a communication link. The first test packet is associated with a layer 2 secure channel that is bound to an emulated network device. The method includes receiving a second test packet from the SUT over the communication link. The second test packet includes an unencrypted portion and an encrypted portion. The method includes forming a test identifier that uniquely identifies the layer 2 secure channel and the emulated network device using a subset of bits from a secure channel identifier in the unencrypted portion of the second test packet. The method includes decrypting the encrypted portion of the second test packet by finding a security key using the test identifier.

18 Claims, 6 Drawing Sheets

(56) References Cited

U.S. PATENT DOCUMENTS

| | | | |
|---|---|---|---|
| 2008/0126559 A1* | 5/2008 | Elzur | H04L 63/0464 709/232 |
| 2008/0137543 A1* | 6/2008 | Mitra | H04L 43/50 370/242 |
| 2009/0307751 A1* | 12/2009 | Lin | H04L 63/162 709/245 |
| 2015/0180743 A1* | 6/2015 | Jana | H04L 43/045 715/736 |
| 2016/0036813 A1 | 2/2016 | Wakumoto et al. | |
| 2017/0279681 A1* | 9/2017 | Vuolteenaho | H04L 41/0866 |
| 2019/0173860 A1* | 6/2019 | Sankaran | H04L 63/0272 |
| 2020/0106702 A1* | 4/2020 | Acharya | H04L 63/20 |
| 2020/0204591 A1* | 6/2020 | Yang | H04L 63/0428 |
| 2020/0252201 A1* | 8/2020 | Sergeev | H04L 43/10 |
| 2020/0280566 A1* | 9/2020 | Raj | H04L 63/0471 |
| 2020/0358764 A1* | 11/2020 | Hojilla Uy | H04L 9/0866 |
| 2021/0314351 A1* | 10/2021 | Mozumdar | H04L 9/0891 |
| 2022/0232009 A1* | 7/2022 | Gordon | H04L 9/0863 |
| 2022/0360566 A1* | 11/2022 | Sawant | G06F 9/45558 |

OTHER PUBLICATIONS

O'Connor D. "Secure Ethernet Service". In National Fiber Optic Engineers Conference Mar. 6, 2005 (p. NThE2). Optica Publishing Group. 10 pages (Year: 2005).*

Hauser, F. et al., "P4-MACsec: Dynamic Topology Monitoring and Data Layer Protection With MACsec in P4-Based SDN," IEEE Access, pp. 58845-58858, vol. 8 (Mar. 23, 2020).

* cited by examiner

METHODS, SYSTEMS, AND COMPUTER READABLE MEDIA FOR TESTING A NETWORK SYSTEM UNDER TEST COMMUNICATING OVER A SECURE CHANNEL

TECHNICAL FIELD

The subject matter described herein relates to testing communications networks. More particularly, the subject matter described herein relates to methods, systems, and computer readable media for testing a network system under test (SUT) communicating over a secure channel.

BACKGROUND

Media access control security (MACsec) is a security protocol that provides point-to-point security on the Ethernet link. The protocol is primarily defined in the IEEE standard 802.1AE. The services it provides are data integrity, encryption/decryption, authentication and replay protection. In the networking industry the demand for higher speed is continuously increasing. At the same time as the services are now mostly distributed across different segments of networks, often in multi-tenant data center environments, where it is important to keep the communication path secured. MACsec is a key protocol in securing this communication path in the data link layer. As the encryption/decryption is offloaded to the hardware, the overall network can maintain the desired data rate without slowing down the overall network speed because of the encryption/decryption.

SUMMARY

The subject matter described herein includes methods, systems, and computer readable media for testing a system under test (SUT). A method includes sending a first test packet to the SUT over a communication link. The first test packet is associated with a layer 2 secure channel that is bound to an emulated network device. The method includes receiving a second test packet from the SUT over the communication link. The second test packet includes an unencrypted portion and an encrypted portion. The method includes forming a test identifier that uniquely identifies the layer 2 secure channel and the emulated network device using a subset of bits from a secure channel identifier in the unencrypted portion of the second test packet. The method includes decrypting the encrypted portion of the second test packet by finding a security key using the test identifier.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein relates to testing communications networks. More particularly, the subject matter described herein relates to methods, systems, and computer readable media for testing a network system under test (SUT) communicating over a secure channel.

Figure 1:
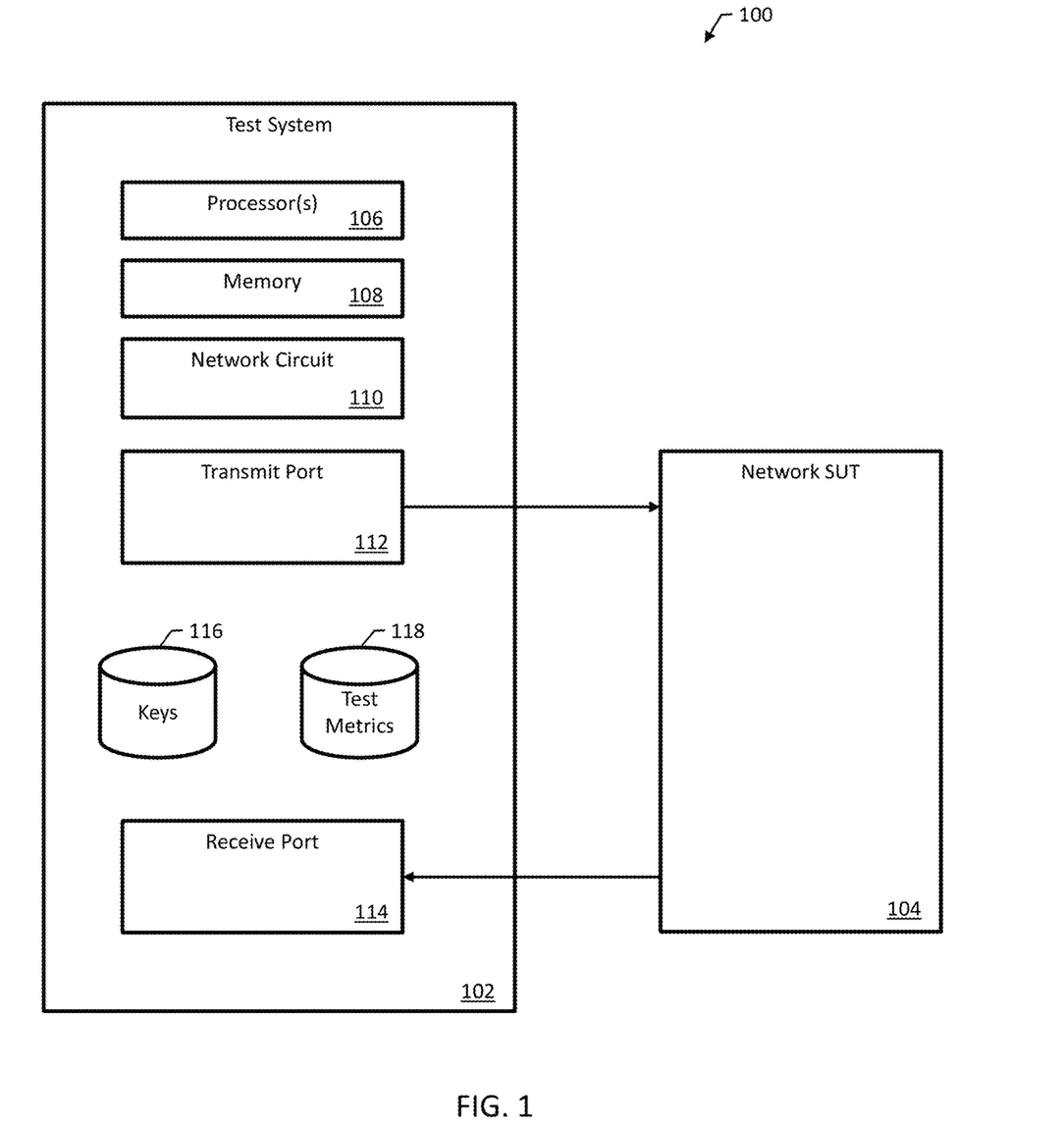
FIG. 1 illustrates an example network test environment.

FIG. 1 illustrates an example network test environment 100 including a test system 102 and a network system under test (SUT) 104. Test system 102 is configured to execute test cases to test the operation of SUT 104. In general, test system 102 generates test packets, sends the test packets to SUT 104 over a communications link, receives test packets, and then generates test metrics based on the received test packets. For example, test system 102 can compare the received test packets to test packets expected based on the generated packets and generate various test metrics qualifying the operation of SUT 104.

SUT 104 can include one or more computer networking devices. In general, SUT 104 receives packets over the communications link and transmits responsive packets. SUT 104 can be, e.g., a router, a switch, a firewall, or any other appropriate networking device, or combinations of networking devices.

Test system 102 includes at least one processor 106, memory 108 storing instructions for processor 106, and at least network circuits 110 configured for processing test packets at a line rate. Network circuit 110 can include, for example, one or more programmable logic devices, e.g., a field programmable gate array (FPGA) or application specific integrated circuit (ASIC) or other appropriate circuitry. Processor 106 can be programmed to configure the network circuit 110 for execution of specific test cases. Test system 102 includes a transmit port 112 and a receive port 114.

Test system 102 is configured for emulating network devices, e.g., network devices that communicate with or using SUT 104 for the purpose of verifying or qualifying the operation of SUT 104. Test system 102 is also configured for creating layer 2 secure channels with SUT 104 for secured communication. Test system 102 can store encryption keys for secure channels between emulated devices in a key repository 116.

Test system 102 also stores test metrics in a repository of test metrics 118. Test metrics can include any appropriate type of test result for test cases executed by test system 102. For example, test metrics can include various types of networking statistics for SUT 104.

Test system 102 is configured for, while executing a test case, decrypting received test packets and storing test metrics at a line rate. In general, a line rate refers to the speed at which bits are sent onto the communications link. SUT 104 may be rated for a certain line rate, and test system 102 is configured for test SUT 104 and various other network devices which may operate at different line rates. To support testing systems at line rate, test system 102 is configured for quickly looking up keys for secure channels and test metrics by forming test identifiers that may have fewer bits than corresponding identifiers used by SUT 104 or other network devices.

In operation, during execution of a test case, test system 102 sends a first test packet to SUT 104 over a communication link. The first test packet is associated with a layer 2 secure channel that is bound to an emulated network device. Test system 102 receives a second test packet from the SUT 104 over the communication link. The second test packet includes an unencrypted portion and an encrypted portion. Test system 102 forms a test identifier that uniquely identifies the layer 2 secure channel and the emulated network device using a subset of bits from the unencrypted portion of the second test packet, for example, from a secure channel identifier.

Test system 102 decrypts the encrypted portion of the second test packet by finding a security key using the test identifier. Test system 102 stores one or more test metrics for the emulated network device in a data structure using the test identifier.

In some examples, the layer 2 secure channel is a medium access security (MACsec) secure channel. Forming the test identifier can include forming a portion of the test identifier as a device identifier from the unencrypted portion of the second test packet. Forming the device identifier can include using one or more of the following values from the unencrypted portion of the second test packet: destination MAC address, VLAN identifier, and MPLS ID. Forming the test identifier can include concatenating the device identifier and N bits from unencrypted portions of the second test packet as secure channel identifier, for example, N of the least significant bits.

In some examples, test system 102 is configured for decrypting the encrypted portion of the second test packet by finding a security key using the test identifier comprises using the test identifier as an index to a key table at a key server. In some examples, forming the test identifier using a subset of bits from a secure channel identifier includes using M of the bits from unencrypted portions of the second test packet as the secure channel identifier, for example, M of the least significant bits.

In some examples, test system 102 is configured for preconfiguring, before initiating a test case, a programmable logic device for forming the test identifier using M bits as a device identifier and N bits as a secure channel identifier. Test system 102 can preconfigure the programmable logic device using processor 106, such that test system 102 and the formation of the test identifier is user configurable.

Figure 2:
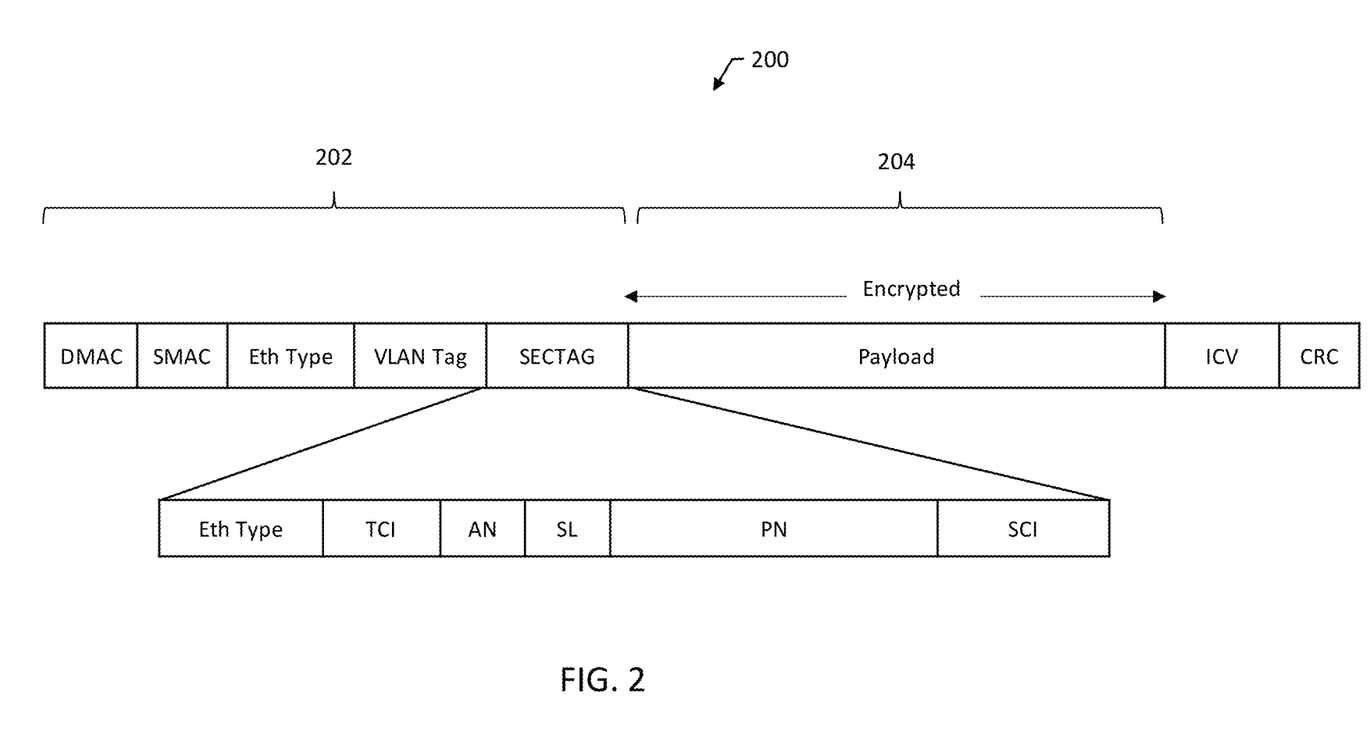
FIG. 2 is a block diagram showing an example test packet.

FIG. 2 is a block diagram showing an example test packet 200 having an unencrypted portion 202 and an encrypted portion 204. Test packet 200 is a media access control security (MACsec) packet. FIG. 2 shows the MACSec packet format, including fields for destination media access control (DMAC) address, source media access control (SMAC) address, virtual local area network (VLAN) tag, security tag (SECTAG), integrity check value (ICV), and cyclical redundancy check (CRC). The SECTAG includes fields for tag control information (TCI), association number (AN), secure link (SL), packet number (PN), and secure channel identifier (SCI).

In the MACsec protocol, encryption of all packet content will ensure that the packets exchanged between endpoints cannot be viewed by anybody who might be sniffing the network. On the other hand, to ensure data integrity, such that no one can modify the packet while in transmit, the protocol introduces a new 16 bytes Integrity Check Value (ICV) in the ethernet frame.

Figure 3:
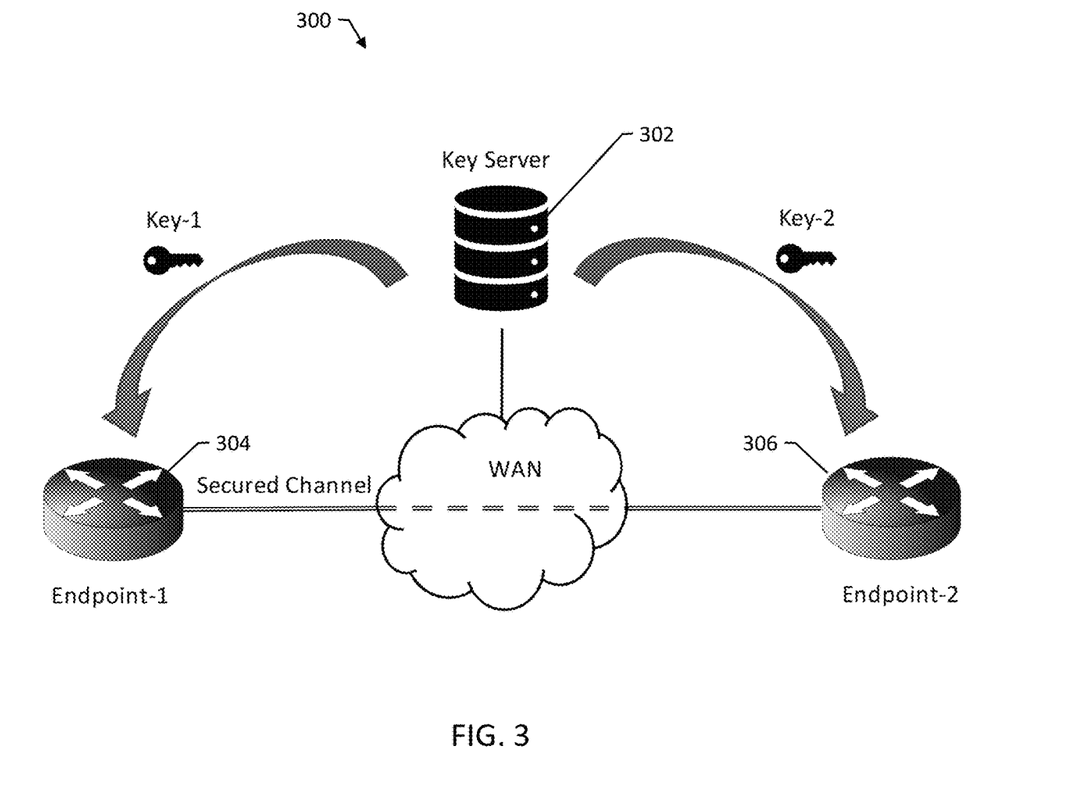
FIG. 3 is a block diagram illustrating the topology of an example MACSec network.

FIG. 3 is a block diagram illustrating the topology of an example MACSec network 300. Network 300 includes a centralized key server 302, a first endpoint 304, and a second endpoint 306 communicating over a wide area network (WAN).

To safeguard against attacks like replay protection, security keys, which are used to encrypt/decrypt the data packets, are refreshed often. Key server 302 is configured for periodically refreshing the keys for the whole network. This key exchange between key server 302 and endpoints 302 and 304 is secured as well and the key exchange process involves additional complexities in the protocol.

Because of these above requirements from the MACsec protocol, the test system 102 of FIG. 1 is configured to support the secured key exchange and agreement, liveness check, encryption/decryption, data integrity. In some examples, key exchange and other control plane message exchanges happen using different stateful modules in software and the traffic generation, encryption/decryption, data integrity checks happen in the hardware.

Test system 102 can be configured for simulating multiple MACsec enabled devices in a single test port. Those devices will create one or many MACsec Secured Channels (SC) with SUT 104.

Once a MACsec packet arrives at receive port 114, network circuit 110 identifies the corresponding destination device, that belongs to a specific secure channel (SC). Upon selecting the correct SC, network circuit 110 detects the proper key to decrypt the packet. Additionally, network circuit 110 updates the statistics for received packets, e.g., on per Secure Channel basis.

In a live scenario for detection of SC, a MACSec enabled node should find the Rx Secure Chanel Identifier (SCI) and use the corresponding key to decrypt the packet. The length of the SCI is 8 bytes. Hence the total number of unique SC-Ids can be $2^{64}$, which can be too large for some test systems to handle at line rate.

Therefore, test system 102 can be configured for performing lookup operations using a test identifier. Instead of using the 8 bytes SCI field o f the packet, test system 102 can take a smaller part of the packet (N number of bits, which is less than 64 bits) and compose the SC identifier. The identifier can be formed using 'N' bits of different protocol fields, for example, destination MAC address, VLAN ID, MPLS labels, SCI, etc. (as applicable, based on the simulated topology). Therefore, when packets are received, test system 102 will only extract 'N' bits, form the SC identifier, and use the keys for decryption. By detecting the corresponding SC using 'N' bits, test system 102 can save both time and memory compared to use the full SC identifier.

In some cases, VLAN ID or MPLS labels can also be used when those fields are positioned before SECTAG. Otherwise the system has to parse 64 bits SCI to identify the appropriate Rx key. On the other hand, to identify the destination device 'M' bits can be taken from same or different protocol.

Figure 4:
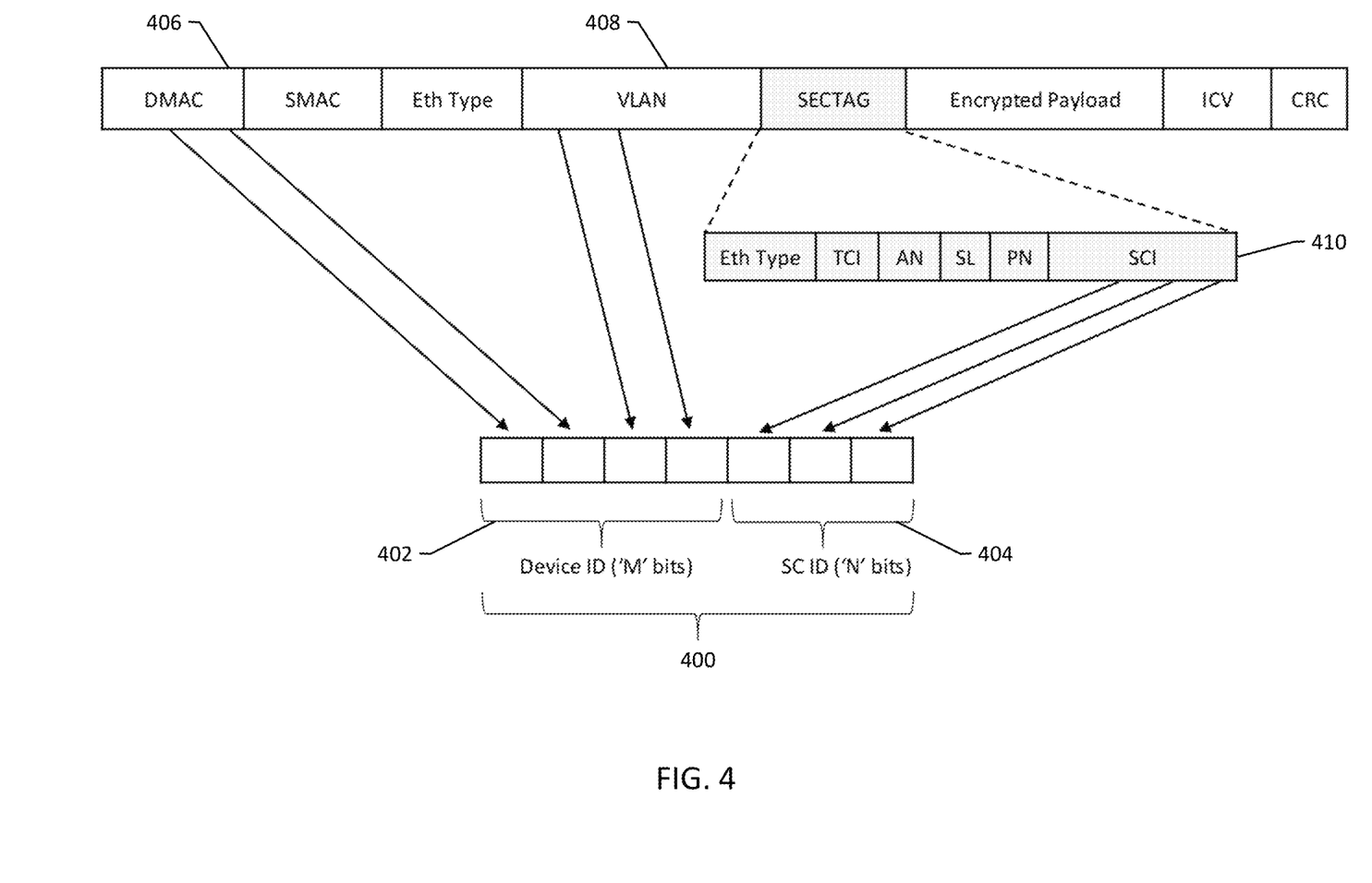
FIG. 4 illustrates forming an example test identifier.

FIG. 4 illustrates forming an example test identifier 400. Test identifier 400 includes a device identifier 402 (M bits) and a secure channel identifier 404 (N bits). Device identifier 402 is formed from a DMAC field 406 and a VLAN field 408 of an example packet. Secure channel identifier 404 is formed from a subset of bits from the SCI field 410.

Consider, for example, a scenario where test system 102 is configured to simulate 16 devices and 8 secure channels. Suppose that the test system 102 uses 4 bits for a device identifier and 3 bits for a secure channel identifier. Now, test system 102 can consider least significant 2 bits of the Destination MAC address and least significant 2 bits of VLAN to identify the device and least significant 3 bits of SCI to identify SC. In this scenario identification will happen as illustrated in the following table:

|         |        |      | SCI last | 'N' bits DMAC LSB | 'M' bits VLAN LSB | Device  | SC   |
|---------|--------|------|----------|-------------------|-------------------|---------|------|
| Packet ID | DMAC | VLAN | 1 byte   | 2bits             | 2bits             | ID      | ID   |
| 1 | AAAAAAAAAA02 | 0x01 | 0x05 | 0b10 | 0b01 | Dev-9  | SC-5 |
| 2 | BBBBBBBBBB01 | 0x01 | 0xA0 | 0b01 | 0b01 | Dev-5  | SC-0 |
| 3 | AAAAAAAAAA05 | 0x03 | 0x11 | 0b01 | 0b11 | Dev-7  | SC-1 |
| 4 | BBBBBBBBBB06 | 0x02 | 0x23 | 0b10 | 0b10 | Dev-10 | SC-3 |
| 5 | ABABABABABA8 | 0x05 | 0x84 | 0b00 | 0b01 | Dev-1  | SC-4 |

As part of the solution 'M', 'N' and those offsets are preconfigured before receiving MACSec packets. With these configurations, test system 102 will be able to identify different devices and secure channels in O(1) complexity.

Because (N+M) bits are distributed to identify SCs and devices, that whole (N+M) bits (i.e., test identifier 400) can also be used to identify a corresponding location of test metrics for the device and SC. Each pair of SC and device can have multiple different types of statistics. With (N+M) bits we will have unique 2N+M "device and SC" pairs, and each pair will have its corresponding statistics. Therefore, when a packet is received, depending on that extracted (N+M) bits, test system 102 can decrypt the packet, identify the destination device, and update the statistics for a suitable device and SC. The identifications can be achieved in O(1) complexity.

Figure 5:
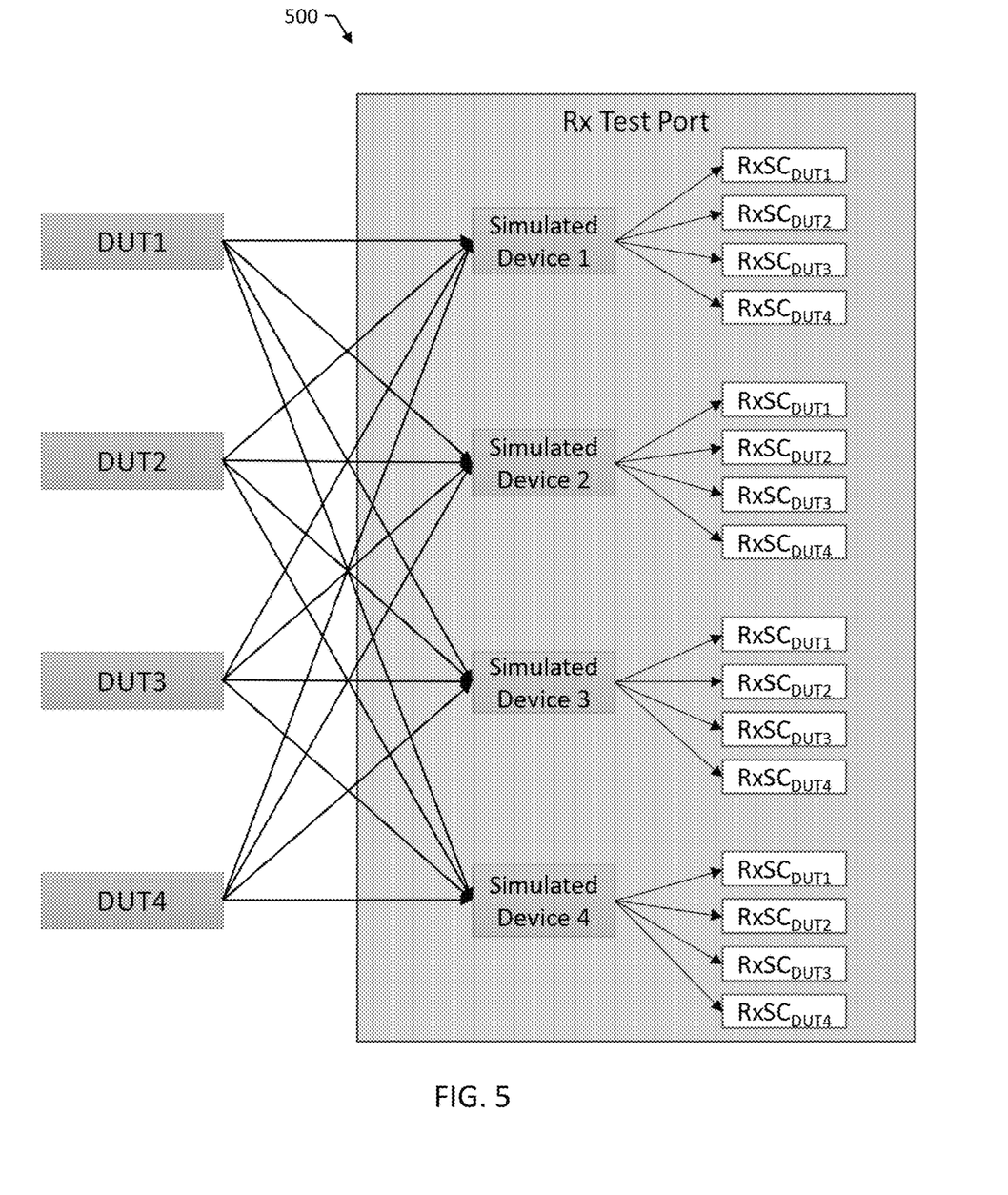
FIG. 5 shows an example topology of a use case for storing test statistics.

For example, suppose that test system 102 is configured for testing four devices under test (DUT). Furthermore, test port is simulating four devices and all simulated devices are connected to all four devices under test. Therefore, each simulated device can have at most four secure channels. That means that a total of 16 MACSec enabled secure channels will be simulated in a receiving test port. FIG. 5 shows an example topology of such a use case.

Figure 6:
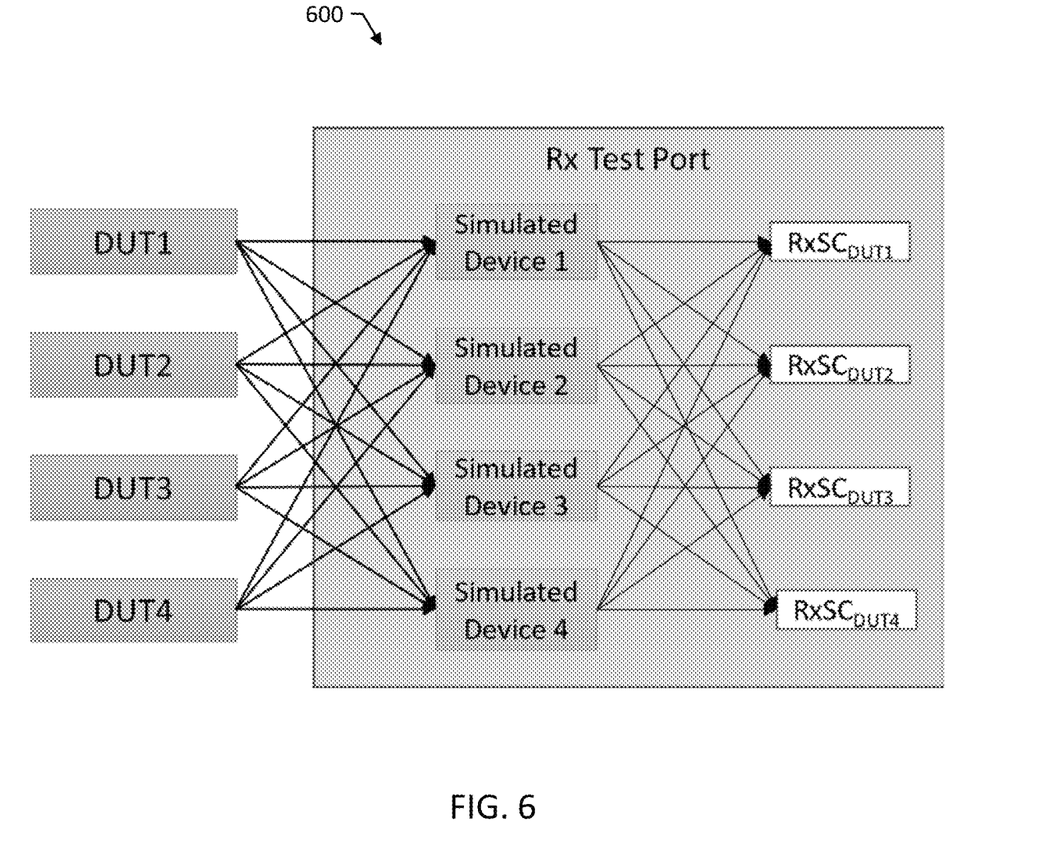
FIG. 6 shows an example of the configuration at the test system.

In this example, simulated devices can be identified using 2 bits (M=2) and secure channels can be identified using 2 bits (N=2). Test system 102 can be configured to keep 4 copies of Rx SCs because the property of one Rx SC is same for all simulated devices. FIG. 6 shows an example of the configuration at the test system 102.

The statistics configurations can be stored, for example, as shown in the table below.

| Device id | Rx SC id | Rx SC Properties  | Statistic 1 | Statistic 2 | ... | Statistic X |
|-----------|----------|-------------------|-------------|-------------|-----|-------------|
| 0 | SC0 | Key0, PN0, SCI0, ... | S0_1  | S0_2  | ... | S0_X  |
|   | SC1 | Key1, PN1, SCI1, ... | S1_1  | S1_2  | ... | S1_X  |
|   | SC2 | Key2, PN3, SCI2, ... | S2_1  | S2_2  | ... | S2_X  |
|   | SC3 | Key3, PN3, SCI3, ... | S3_1  | S3_2  | ... | S3_X  |
| 1 | SC0 | Key0, PN0, SCI0, ... | S4_1  | S4_2  | ... | S4_X  |
|   | SC1 | Key1, PN1, SCI1, ... | S5_1  | S5_2  | ... | S5_X  |
|   | SC2 | Key2, PN3, SCI2, ... | S6_1  | S6_2  | ... | S6_X  |
|   | SC3 | Key3, PN3, SCI3, ... | S7_1  | S7_2  | ... | S7_X  |
| 2 | SC0 | Key0, PN0, SCI0, ... | S8_1  | S8_2  | ... | S8_X  |
|   | SC1 | Key1, PN1, SCI1, ... | S9_1  | S9_2  | ... | S9_X  |
|   | SC2 | Key2, PN3, SCI2, ... | S10_1 | S10_2 | ... | S10_X |
|   | SC3 | Key3, PN3, SCI3, ... | S11_1 | S11_2 | ... | S11_X |
| 3 | SC0 | Key0, PN0, SCI0, ... | S12_1 | S12_2 | ... | S12_X |
|   | SC1 | Key1, PN1, SCI1, ... | S13_1 | S13_2 | ... | S13_X |
|   | SC2 | Key2, PN3, SCI2, ... | S14_1 | S14_2 | ... | S14_X |
|   | SC3 | Key3, PN3, SCI3, ... | S15_1 | S15_2 | ... | S15_X |

In some examples, using those 4 bits, packets arriving at the receive port will be bucketized in any of the values between 0 to 15. Therefore, if test system 102 can extract those 4 bits from the packet, it can derive the location of the statistics easily. So, it can be visualized that if we increase the number of bits of N and M, we can support a wide range of combinations between the number of devices and Rx SCs.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for testing a system under test (SUT), the system comprising:
    sending a first test packet to the SUT over a communication link, wherein the first test packet is associated with a layer 2 secure channel that is bound to an emulated network device;
    receiving a second test packet from the SUT over the communication link, wherein the second test packet includes an unencrypted portion and an encrypted portion;
    forming a test identifier that uniquely identifies the layer 2 secure channel and the emulated network device using a subset of bits from the unencrypted portion of the second test packet, wherein forming the test identifier comprises forming a portion of the test identifier as a device identifier from the unencrypted portion of the second test packet such that the device identifier uniquely identifies the emulated network device from a plurality of other emulated network devices, and wherein forming the portion of the test identifier as the device identifier comprises using both a destination media access control (MAC) address and virtual local area network (VLAN) identifier; and
    decrypting the encrypted portion of the second test packet by finding a security key using the test identifier, wherein decrypting the encrypted portion of the second test packet by finding a security key using the test identifier comprises using the test identifier, including the device identifier that uniquely identifies the emulated network device, as an index to a key table.

2. The method of claim 1, comprising storing one or more test metrics for the emulated network device in a data structure using the test identifier.

3. The method of claim 1, wherein the layer 2 secure channel is a medium access control security (MACsec) secure channel.

4. The method of claim 1, wherein forming the portion of the test identifier as a device identifier comprises using a multi-protocol label lab& switching identifier (MPLS ID).

5. The method of claim 1, wherein forming the test identifier comprises concatenating the device identifier and N bits from the unencrypted portion of the second test packet.

6. The method of claim 1, comprising receiving a plurality of incoming test packets, forming test identifiers for the incoming packets, and decrypting the incoming packets at line rate.

7. The method of claim 1, wherein using the test identifier as the index to the key table comprises accessing the key table at a key server.

8. The method of claim 1, wherein forming the test identifier using a subset of bits comprises using M bits of the unencrypted portion of the second packet.

9. The method of claim 1, comprising preconfiguring, before initiating a test case, a programmable logic device for forming the test identifier using M bits as a device identifier and N bits as a secure channel identifier.

10. A system for testing a system under test (SUT), the system comprising:
    one or more processors and memory storing instructions for the one or more processors; and
    one or more networking circuits configured, by the one or more processors, for performing operations comprising:
        sending a first test packet to the SUT over a communication link, wherein the first test packet is associated with a layer 2 secure channel that is bound to an emulated network device;
        receiving a second test packet from the SUT over the communication link, wherein the second test packet includes an unencrypted portion and an encrypted portion;
        forming a test identifier that uniquely identifies the layer 2 secure channel and the emulated network device using a subset of bits from the unencrypted portion of the second test packet, wherein forming the test identifier comprises forming a portion of the test identifier as a device identifier from the unencrypted portion of the second test packet such that the device identifier uniquely identifies the emulated network device from a plurality of other emulated network devices, and wherein forming the portion of the test identifier as the device identifier comprises using both a destination media access control (MAC) address and virtual local area network (ULAN) identifier; and
        decrypting the encrypted portion of the second test packet by finding a security key using the test identifier, wherein decrypting the encrypted portion of the second test packet by finding a security key using the test identifier comprises using the test identifier, including the device identifier that uniquely identifies the emulated network device, as an index to a key table.

11. The system of claim 10, the operations comprising storing one or more test metrics for the emulated network device in a data structure using the test identifier.

12. The system of claim 10, wherein the layer 2 secure channel is a medium access control security (MACsec) secure channel.

13. The system of claim 10, wherein forming the portion of the test identifier as a device identifier comprises using a multi-protocol label switching identifier (MPLS ID).

14. The system of claim 10, wherein forming the test identifier comprises concatenating the device identifier and N bits from the unencrypted portion of the second test packet as a secure channel identifier.

15. The system of claim 10, the operations comprising receiving a plurality of incoming test packets, forming test identifiers for the incoming packets, and decrypting the incoming packets at line rate.

16. The system of claim 10, wherein decrypting the encrypted portion of the second test packet by finding a security key using the test identifier comprises using the test identifier as an index to a key table at a key server.

17. The system of claim 10, wherein forming the test identifier using a subset of bits comprises using M bits of the unencrypted portion of the second packet.

18. The system of claim 10, wherein the one or more network circuits comprise at least one programmable logic device, the operations comprising preconfiguring, before initiating a test case, the programmable logic device for forming the test identifier using M bits as a device identifier and N bits as a secure channel identifier.

\* \* \* \* \*